(12) United States Patent
Tian et al.

(10) Patent No.: US 10,627,821 B2
(45) Date of Patent: Apr. 21, 2020

(54) AERIAL SHOOTING METHOD AND SYSTEM USING A DRONE

(71) Applicant: Yuneec International (China) Co, Ltd, Kunshan (CN)

(72) Inventors: Yu Tian, Kunshan (CN); Wenyan Jiang, Kunshan (CN)

(73) Assignee: Yuneec International (China) Co, Ltd, Kunshan (CN)

( * ) Notice: Subject to any disclaimer, the term of this patent is extended or adjusted under 35 U.S.C. 154(b) by 177 days.

(21) Appl. No.: 15/494,454

(22) Filed: Apr. 22, 2017

(65) Prior Publication Data
US 2017/0308087 A1  Oct. 26, 2017

(30) Foreign Application Priority Data

Apr. 22, 2016  (CN) ............................ 2016 1 0256742
Apr. 22, 2016  (CN) ...................... 2016 2 0346470 U

(51) Int. Cl.
*G05D 1/00* (2006.01)
*B64C 39/02* (2006.01)

(52) U.S. Cl.
CPC ......... *G05D 1/0094* (2013.01); *B64C 39/024* (2013.01); *B64C 2201/121* (2013.01); *B64C 2201/141* (2013.01)

(58) Field of Classification Search
CPC .... G05D 1/0094; G05D 1/101; G05D 1/0011; G05D 1/0016; G05D 1/0038; G05D 1/0044; G05D 1/0088; G05D 1/0022; G05D 1/102; G05D 1/0033; G05D 1/12; B64C 39/024; B64C 2201/146; B64C 2201/127;

(Continued)

(56) References Cited

U.S. PATENT DOCUMENTS 9,162,753 B1 * 10/2015 Panto ..................... B64C 19/00
9,605,926 B1 *  3/2017 Means ..................... F41G 3/26
(Continued)

FOREIGN PATENT DOCUMENTS

CN        202183048 U    4/2012
CN        104035446 A    9/2014
(Continued)

OTHER PUBLICATIONS

The first Office Action and search report for Chinese Application No. 201610256742.X, dated Oct. 8, 2019, 13 pages.

*Primary Examiner* — Alexander G Kalinowski
*Assistant Examiner* — Sanjeev Malhotra
(74) *Attorney, Agent, or Firm* — Law Offices of Liaoteng Wang

(57) ABSTRACT

The present disclosure relates to an aerial shooting method and system using a drone, wherein the aerial shooting method using a drone comprises steps of presetting an aerial path and generating a first operation instruction based on the preset aerial path; controlling the drone to fly along the preset aerial path according to the first operation instruction; marking a plurality of waypoints during the flight of the drone along the preset aerial path; planning a flight path based on the plurality of waypoints and generating a flight instruction based on the flight path; making the drone automatically fly along the flight path according to the flight instruction; and controlling the drone to shoot during the automatic flight of the drone.

18 Claims, 3 Drawing Sheets

(58) Field of Classification Search
CPC ........ B64C 2201/141; B64C 2201/027; B64C
2201/024; B64C 2201/108; B64C
2201/145; B64C 2201/123; B64C
2201/128; B64C 19/00; B64C 2201/042;
B64C 2201/12; B64C 2201/121; B64C
27/08; B64C 39/02; G08G 5/0069; G08G
5/006; G08G 5/045; G08G 5/0034; G08G
5/0039; G08G 5/0013; G08G 5/0026;
G08G 5/0086; G08G 5/0078; G08G
5/0082; B64D 47/08; B64D 43/00; A63F
13/211; A63F 13/216; A63F 13/837;
F41G 3/26; F41G 7/008; F41G 7/2246;
F41G 7/2253; F41G 7/2293; F41G 9/002;
F41J 2/00; F41J 5/14; G01C 23/00; G01S
19/13; G01S 19/42; G60K 9/0063; G60K
9/00637; G60K 9/00771; G08C 17/02;
H04L 67/12; H04L 67/125; H04N
5/23293; H04N 7/185; F41H 11/02
USPC ................. 701/2, 3, 302; 396/8; 348/148;
244/110 F
See application file for complete search history.

(56) References Cited

U.S. PATENT DOCUMENTS

| | | | |
|---|---|---|---|
| 9,816,783 B1* | 11/2017 | Means | F41G 3/26 |
| 2009/0132100 A1* | 5/2009 | Shibata | A01M 7/0089 |
| | | | 701/2 |
| 2010/0198514 A1* | 8/2010 | Miralles | F41G 7/008 |
| | | | 701/302 |
| 2011/0046817 A1* | 2/2011 | Hamke | G05D 1/101 |
| | | | 701/3 |
| 2014/0119716 A1* | 5/2014 | Ohtomo | G01C 11/00 |
| | | | 396/8 |
| 2016/0025457 A1* | 1/2016 | Miralles | F41G 7/008 |
| | | | 701/3 |
| 2016/0039436 A1* | 2/2016 | Bhagwatkar | B64C 39/024 |
| | | | 348/148 |
| 2016/0054733 A1* | 2/2016 | Hollida | H04N 5/23293 |
| | | | 701/2 |
| 2016/0054737 A1* | 2/2016 | Soll | G11B 27/031 |
| | | | 701/3 |
| 2016/0070265 A1* | 3/2016 | Liu | B64C 39/024 |
| | | | 701/3 |
| 2016/0116914 A1* | 4/2016 | Mucci | G05D 1/101 |
| | | | 701/2 |
| 2016/0216072 A1* | 7/2016 | McNeil | F41G 3/02 |
| 2016/0246304 A1* | 8/2016 | Canoy | G05D 1/0816 |
| 2016/0266579 A1* | 9/2016 | Chen | B64C 39/024 |
| 2016/0306351 A1* | 10/2016 | Fisher | H04W 4/70 |
| 2016/0313734 A1* | 10/2016 | Enke | G05D 1/0088 |
| 2016/0327950 A1* | 11/2016 | Bachrach | G05D 1/0016 |
| 2016/0376004 A1* | 12/2016 | Claridge | B64C 19/00 |
| | | | 701/3 |
| 2016/0376029 A1* | 12/2016 | Sekiya | F41H 11/02 |
| | | | 244/110 F |
| 2017/0010611 A1* | 1/2017 | Tao | G06F 3/147 |
| 2017/0036771 A1* | 2/2017 | Woodman | B64C 39/024 |
| 2017/0039857 A1* | 2/2017 | Kwan | H04L 67/025 |
| 2017/0083027 A1* | 3/2017 | Tao | G08G 5/0039 |
| 2017/0186329 A1* | 6/2017 | Gao | G05D 1/0011 |
| 2017/0199053 A1* | 7/2017 | Peng | G06F 17/40 |
| 2017/0206414 A1* | 7/2017 | Schultz | B64D 47/08 |
| 2017/0229022 A1* | 8/2017 | Gurel | G05D 1/0033 |
| 2017/0269594 A1* | 9/2017 | Sydnor | B64C 39/024 |
| 2017/0285627 A1* | 10/2017 | Feldmann | H04B 7/1851 |
| 2018/0046177 A1* | 2/2018 | Hu | G08C 17/02 |
| 2018/0120846 A1* | 5/2018 | Falk-Pettersen | G05D 1/0016 |
| 2018/0203465 A1* | 7/2018 | Suzuki | A47G 29/14 |

FOREIGN PATENT DOCUMENTS

| | | |
|---|---|---|
| CN | 104111658 A | 10/2014 |
| CN | 104656669 A | 5/2015 |
| CN | 204406209 U | 6/2015 |
| CN | 105045279 A | 11/2015 |
| CN | 105242685 A | 1/2016 |
| CN | 105704432 A | 6/2016 |

* cited by examiner

AERIAL SHOOTING METHOD AND SYSTEM USING A DRONE

CROSS REFERENCE

The present disclosure claims priority to Chinese Application No. 201620346470.8, which was submitted to State Intellectual Property Office of China on Apr. 22, 2016, and the Chinese Application No. 201610256742.X, which was submitted to State Intellectual Property Office of China on Apr. 22, 2016. Both of the disclosures of those above applications are incorporated herein by reference in their entireties.

TECHNICAL FIELD

The present disclosure relates to a technical field of drone aerial shooting, and in particular, relates to a drone aerial shooting method and system.

BACKGROUND

Currently, the drone aerial shooting by presetting multiple waypoints is achieved mainly by manual operation of a drone flyer. Such aerial shooting method mainly relies on the flight operation experience of the drone flyer, and requires the drone flyer to concentrate on the controlling of the drone. Further, such aerial shooting method has the following disadvantages.

Firstly, it is difficult to keep the drone to fly along an optimal aerial path preset initially by manual operation, and also it is difficult to ensure the consistency of the flight speed during the aerial shooting; and Secondly, it is necessary for the drone flyer to control the drone to shoot at the same time when he or she manually controls the drone to fly along an aerial path of automatic waypoints, and this means high complicated operation, which is prone to cause misoperation and even causing that the drone gets out of control or crash.

SUMMARY

The present disclosure provides an aerial shooting method and system using a drone, in which the drone can automatically fly and operation is simple.

The aerial shooting method using a drone of the present disclosure comprises steps of:

S1, presetting an aerial path and generating a first operation instruction based on the preset aerial path;

S2, controlling the drone to fly along the preset aerial path according to the first operation instruction;

S3, marking a plurality of waypoints during the flight of the drone along the preset aerial path;

S4, planning a flight path based on the plurality of waypoints and generating a flight instruction based on the flight path;

S5, making the drone automatically fly along the flight path according to the flight instruction; and S6, controlling the drone to shoot during the automatic flight of the drone.

The present disclosure further provides an aerial shooting system using a drone, comprising a ground station, a drone and a control device disposed on the drone, and the system further comprises a pan-and-tilt disposed on the drone and a camera disposed on the pan-and-tilt, wherein, the ground station is adapted to preset an aerial path, generate a first operation instruction based on the preset aerial path, and transmit the first operation instruction to the control device;

the control device is adapted to control the drone to fly along the preset aerial path according to the first operation instruction;

the ground station is adapted to mark a plurality of waypoints during the flight of the drone along the preset aerial path, and transmit the plurality of waypoints to the control device;

the control device is adapted to plan a flight path based on the plurality of waypoints, generate a flight instruction based on the flight path, and transmit the flight instruction to the drone;

the drone is adapted to automatically fly along the flight path according to the flight instruction; and the control device is adapted to control the pan-and-tilt and the camera to shoot during the automatic flight of the drone.

DETAILED DESCRIPTION

Next, the present disclosure will be further described by use of implementations. However, the present disclosure is not intended to be limited into the scope of the implementations.

Figure 1:
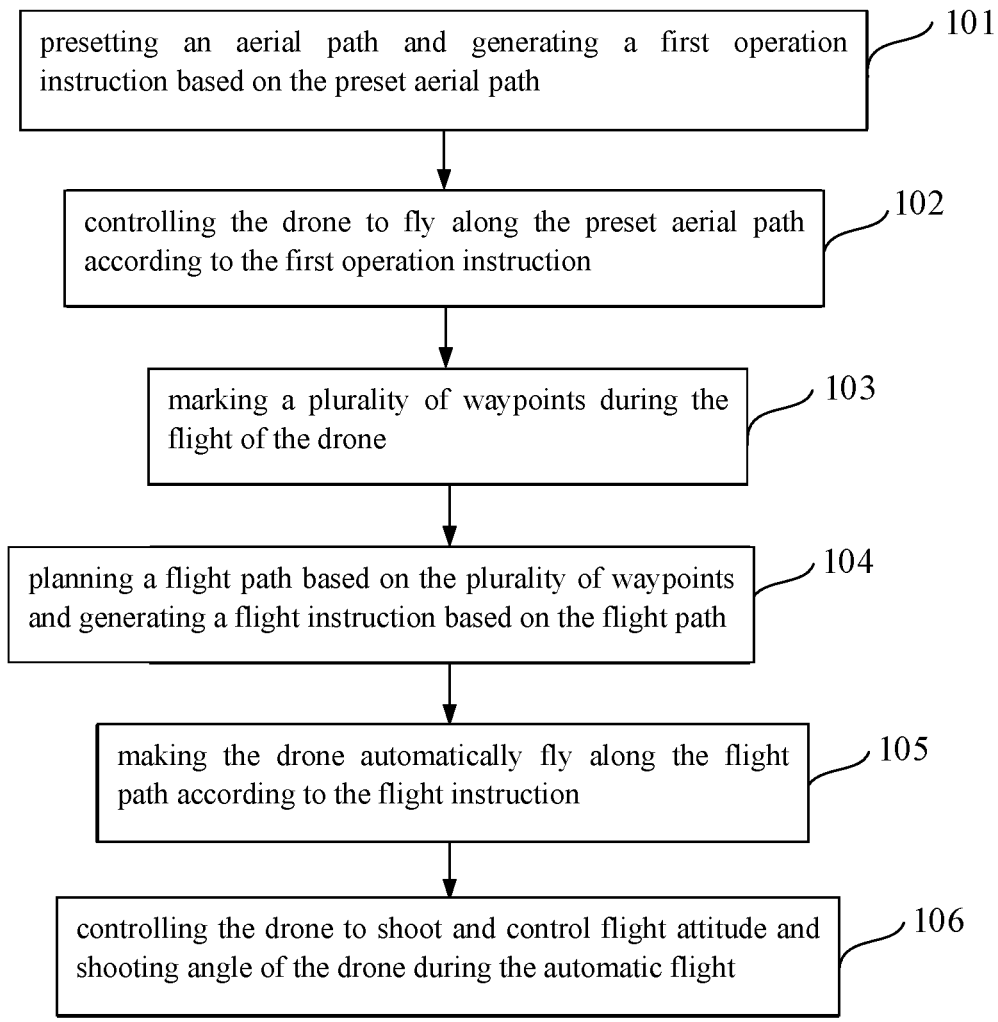
FIG. 1 schematically shows a flow chart of the aerial shooting method using a drone according to some implementations of the present disclosure.

Some implementations of the present disclosure provide an aerial shooting method using a drone (as shown in FIG. 1), which comprises steps of:

Step 101, presetting an aerial path and generating a first operation instruction based on the preset aerial path;

Step 102, controlling a drone to fly along the preset aerial path according to the first operation instruction;

Step 103, marking a plurality of waypoints during the flight of the drone along the preset aerial path;

Step 104, planning a flight path based on the plurality of waypoints and generating a flight instruction based on the flight path;

Step 105, making the drone automatically fly along the flight path according to the flight instruction; and Step 106, controlling the drone to shoot during the automatic flight of the drone.

In the above implementations, at first, the drone is controlled to fly along a preset aerial path, and a plurality of waypoints are marked during the flight; then, a flight path is planned based on the marked waypoints, and a flight instruction is generated based on the planned flight path; at last, the drone automatically flies along the planned flight path and shoots. Wherein, it is a manual operation to control the drone to fly along the preset aerial path, and the drone does not shoot during the manually operated flight of the drone; and the drone automatically flies along the planned flight path upon receiving the flight instruction, without participation of an operator, such as a drone flyer.

In the Step 103, the more the waypoints are marked, the closer the flight path planned based on the waypoints is to the preset aerial path. In particular, the drone does not shoot during the manually operated flight along the preset aerial path, while shoots during the automatic flight. Such manner of shooting provides simple operation for an operator, and can effectively avoid misoperation. Additionally, the drone can automatically fly along the planned flight path strictly when shooting, and consistency of flight speed during the aerial shooting can be ensured.

According to some implementations of the present disclosure, flight attitude of the drone is further controlled during the automatic flight of the drone. Specifically, the flight attitude of the drone can be controlled by manual operation during the automatic flight of the drone. For example, when there is an emergency, the drone can stop, back off, accelerate or decelerate in response to the manual operation, to avoid adverse effects caused by the emergency.

Specifically, the flight attitude of the drone includes starting, stopping, going forward, backing off, acceleration and deceleration.

According to some implementations of the present disclosure, shooting angle of the drone is further controlled during the automatic flight of the drone. Specifically, the shooting angle of the drone can be controlled by manual operation during the automatic flight of the drone, so that images obtained by the drone can be more in line with the user's wishes.

Figure 2:
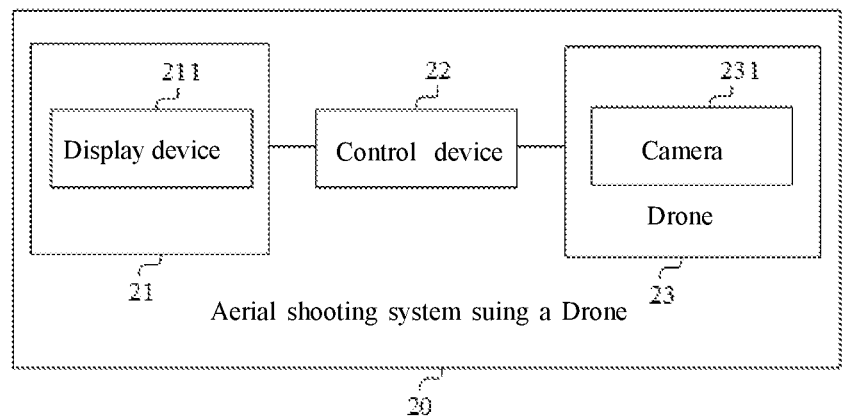
FIG. 2 schematically shows a block diagram of the aerial shooting system using a drone according to some implementations of the present disclosure.

Some implementations of the present disclosure further provides an aerial shooting system using a drone 20, which comprises a ground station 21, a control device 22, a drone 23, a pan-and-tilt 24 disposed on the drone 23, and a camera 25 disposed on the pan-and-tilt 24, as shown in FIG. 2. Wherein, the ground station 21 comprises a display device 211, and the control device 22 is disposed on the drone 23.

The ground station 21 is adapted to preset an aerial path, generate a first operation instruction based on the preset aerial path, and transmit the first operation instruction to the control device 22.

The control device 22 is adapted to control the drone to fly along the preset aerial path based on the first operation instruction.

The ground station 21 is adapted to mark a plurality of waypoints during the flight of the drone, and transmit the plurality of waypoints to the control device 22.

The control device 22 is adapted to plan a flight path based on the plurality of waypoints, generate a flight instruction based on the flight path, and transmit the flight instruction to the drone 23.

The drone 23 is adapted to automatically fly along the flight path according to the flight instruction.

The control device 22 is adapted to control the pan-and-tilt 24 and the camera 25 to shoot during the automatic flight of the drone 23.

As a result, the drone flyer can preset an aerial path via the ground station, which can transmit a first operation instruction to the control device based on the preset aerial path, so that the control device can control the drone to fly along the preset aerial path. The drone flyer also can mark the waypoints via the ground station. The control device is adapted to plan a flight path based on the waypoints, generate a flight instruction based on the flight path, and transmit the flight instruction to the drone, so that the drone can automatically fly along the planned flight path. The control device can further control the pan-and-tilt and the camera to shoot during the automatic flight of the drone.

According to some implementations, the control device 22 is further adapted to transmit flight parameters of the drone 23 and images captured by the camera 25 to the display device 211, which is adapted to display the flight parameters and the captured images. Therefore, during the automatic flight of the drone, the flight parameters and the captured images can be looked over on the display device, which is very intuitive and convenient.

According to some implementations, the flight parameters may include flight speed, flight distance, flight altitude, and the like.

In some implementations, the ground station 21 is further adapted to receive a second operation instruction and a third operation instruction, and transmit both the instructions to the control device 22; and the control device 22 is further adapted to control the flight attitude of the drone 23 according to the second operation instruction, and control the shooting angle of the camera 25 according to the third operation instruction. Therefore, the drone flyer can control the flight attitude of the drone by inputting the second operation instruction via the ground station, and control the shooting angle of the camera by inputting the third operation instruction via the ground station.

In the above implementations, Android system can be used for the ground station, chips of STM32F4 series produced by STMicroelectronics, and camera module with a Wireless Image Transferred System of 5.8 G can be used for the camera. Each of the ground station and the control device includes a wireless transceiver module, and the ground station and the control device receive and transmit information by their respective wireless transceiver module. The wireless transceiver module can be implemented as Bluetooth module, Wi-Fi transponder, etc.

Next, a specific example is described as below to illustrate how to perform aerial shooting by use of the aerial shooting system using a drone as described in the above implementations.

At first, a drone flyer A presets an aerial path L1 via the ground station, which transmits a first operation instruction to the control device based on the aerial path L1, and then, the control device controls the drone to fly along the aerial path L1. Then, the drone flyer A marks waypoints via the ground station when the drone flies along the aerial path L1, and wherein 50 waypoints are marked during the whole flight. Finally, the control device plans a flight path L2 based on the 50 waypoints, generates a flight instruction according to the planned flight path L2, and transmits the flight instruction to the drone. As a result, the drone can automatically fly along the flight path L2 according to the flight instruction. Wherein, during the automatic flight of the drone, the control device can control the pan-and-tilt and the camera to shoot, and thus the aerial shooting of the drone can be achieved. Further, during the automatic flight of the drone, the drone flyer A can look over the flight parameters of the drone and the images captured by the camera.

In the above example, both the aerial path L1 and the flight path L2 are in a form of a curve, and the drone can automatically fly along the flight path L2 upon receiving the flight instruction. That is to say, there is no participation of the drone flyer A when the drone automatically flies along the flight path L2. During the automatic flight of the drone, if the drone flyer A finds that there is an emergency in the front of the drone, the drone flyer A can input the second instruction via the ground station, to control the drone to stop; and if the drone flyer A finds that the captured images do not meet the expected requirements, the drone flyer A can input the third operation instruction via the ground station, to control the shooting angle of the camera.

The drone in the above implementations does not shoot during the flight along the preset aerial path L1 operated by the drone flyer A, while shoots when the drone automatically flies. Such manner of aerial shooting provides simple operation for the drone flyer A, and can effectively avoid misoperation. Additionally, the drone can automatically fly along the planned flight path L2 strictly when the aerial shooting is performed, and thus consistency of flight speed during the aerial shooting can be ensured.

According to some implementations, the ground station can include a remote controller. Particularly, the remote controller may include a master remote controller and a slave remote controller. Remote control mode of the remote controllers may include a dual control mode and a single control mode, wherein in the single control mode, either one of the master remote controller and the slave remote controller is in communication connection with a drone, a pan-and-tilt and a camera, and in the dual control mode, the master remote controller is in communication connection with the drone while the salve remote controller is in communication connection with the pan-and-tilt and the camera. Each of the master remote controller and the slave remote controller can be in communication connection with the drone, the pan-and-tilt and the camera directly, and also can be indirectly in communication connection with the drone, the pan-and-tilt and the camera via the control device as described in the above implementations. Further, the ground station further comprises a switch for switching the control mode of the remote controller.

Figure 3:
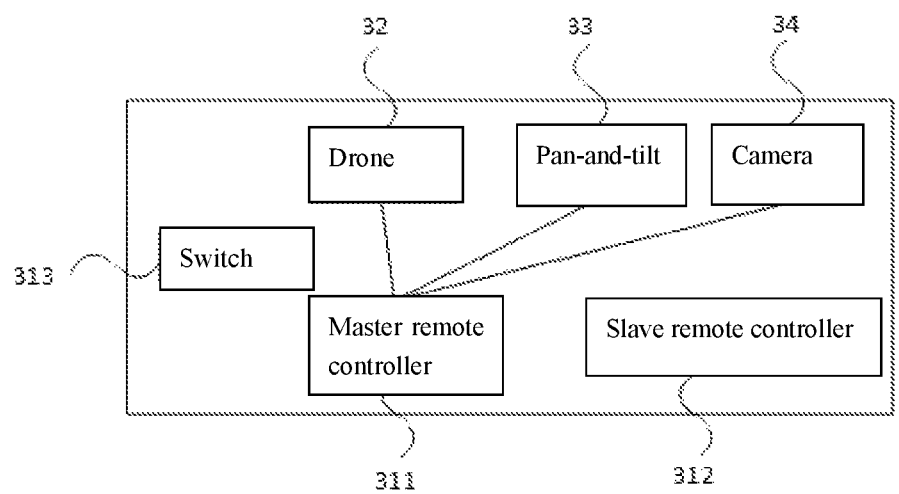
FIG. 3 schematically shows a block diagram of the aerial shooting system using a drone in a single control mode using master remote controller, according to some implementations of the present disclosure.
Figure 4:
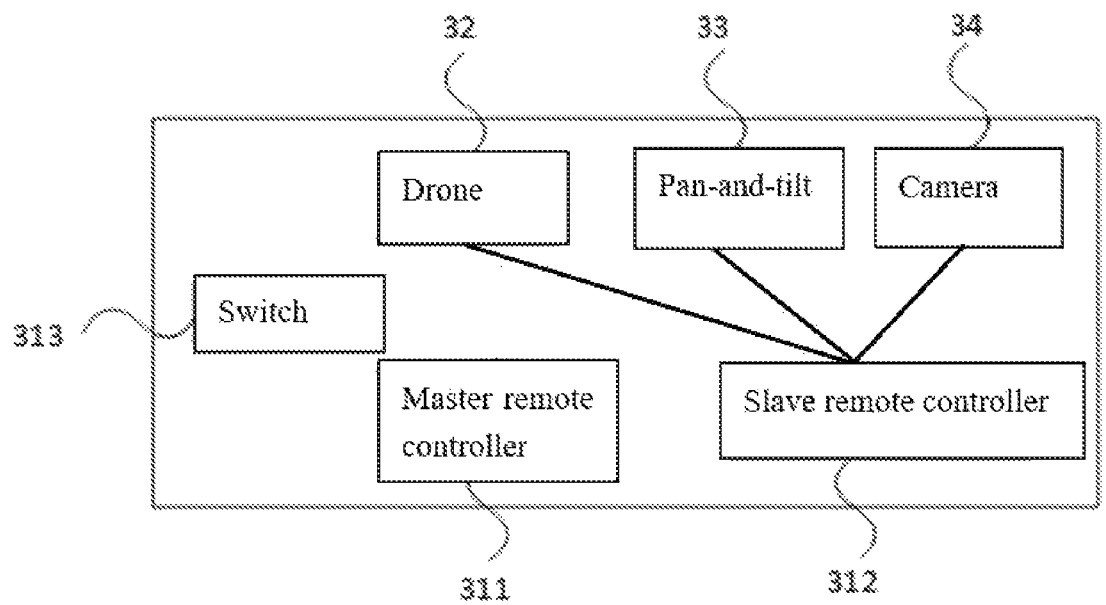
FIG. 4 schematically shows a block diagram of the aerial shooting system using a drone in a single control mode using slave remote controller, according to some implementations of the present disclosure.
Figure 5:
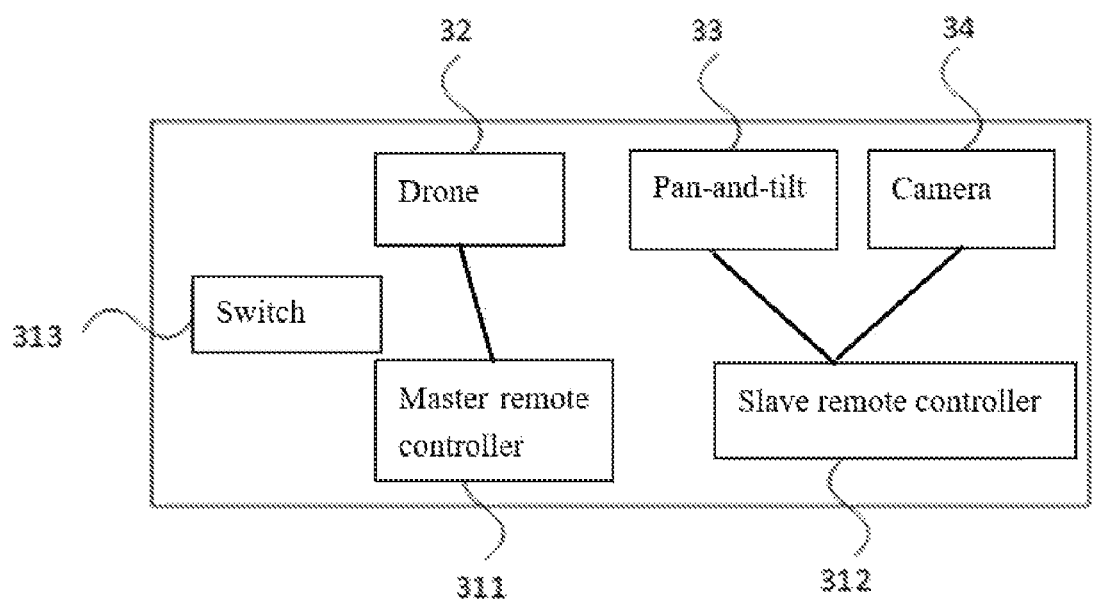
FIG. 5 schematically shows a block diagram of the aerial shooting system using a drone in a dual control mode, according to some implementations of the present disclosure.

FIG. 3-FIG. 5 schematically illustrate the block diagram of the aerial shooting system using a drone in various control mode, according to some implementations of the present disclosure. Specifically, FIG. 3 schematically illustrate a block diagram of the aerial shooting system using a drone in a single control mode using master remote controller according to some implementations of the present disclosure; FIG. 4 schematically illustrate a block diagram of the aerial shooting system using a drone in a single control mode using slave remote controller according to some implementations of the present disclosure; and FIG. 5 schematically illustrate a block diagram of the aerial shooting system using a drone in a dual control mode according to some implementations of the present disclosure.

As shown in FIG. 3, in the single control mode using master remote controller, the master remote controller 311 is configured to be in communication connection with and remotely control a drone 32, a pan-and-tilt 33 and a camera 34.

As shown in FIG. 4, in the single control mode using slave remote controller, the slave remote controller 312 is configured to be in communication connection with and remotely control the drone 32, the pan-and-tilt 33 and the camera 34.

As shown in FIG. 5, under the dual control mode, the master remote controller 311 is configured to be in communication connection with and remotely control the drone 32, and the slave remote controller 312 is configured to be in communication connection with and remotely control the pan-and-tilt 33 and the camera 34.

According to some implementations, a switch 313 is configured to switch the control mode of the remote controllers between the single control mode and dual control mode.

In the single control mode using master remote controller, the switch 313 may be configured to disconnect the communication connection between the master remote controller 311 and the pan-and-tilt 33 and the camera 34, and establish the communication connection between the slave remote controller 312 and the pan-and-tilt 33 and the camera 34, so as to switch the control mode from the single control mode using master remote controller to the dual control mode. In the dual control mode, the master remote controller 311 remotely controls the drone 32 and the slave remote controller 312 remotely controls the pan-and-tilt 33 and the camera 34.

In the single control mode using slave remote controller, the switch 313 may be configured to disconnect the communication connection between the slave remote controller 312 and the drone 32, and establish the communication connection between the master remote controller 311 and the drone 32, so as to switch the control mode from the single control mode using slave remote controller to the dual control mode. In the dual control mode, the master remote controller 311 remotely controls the drone 32 and the slave remote controller 312 remotely controls the pan-and-tilt 33 and the camera 34.

Therefore, by switch of the single control mode to the dual control mode via the switch 313, the master remote controller 311 merely controls the drone 32 while the slave remote controller 312 controls the pan-and-tilt 33 and the camera 34. This reduces difficulty of controlling the drone 32, the pan-and-tilt 33 and the camera 34 by use of the same remote controller, being convenient and practical.

In the dual control mode, the switch 313 can be configured to disconnect a communication connection between the slave remote controller 312 and the pan-and-tilt 33 and the camera 34, and establish a communication connection between the master remote controller 311 and the pan-and-tilt 33 and the camera 34, so as to switch the control mode from the dual control mode to the single control mode using master remote controller. Wherein, in the single control mode using master remote controller, the master remote controller 311 is configured to remotely control the drone 32, the pan-and-tilt 33 and the camera 34.

In the dual control mode, the switch 313 can be further configured to disconnect the communication connection between the master remote controller 311 and the drone 32, and establish the communication connection between the slave remote controller 312 and the drone 32, so as to switch the control mode from the dual control mode to the single control mode using slave remote controller. Wherein, in the single control mode using slave remote controller, the slave remote controller 312 is configured to remotely control the drone 32, the pan-and-tilt 33 and the camera 34.

Therefore, by the switch of the dual control mode to the single control mode via the switch 313, either one of the master remote controller 311 and the slave remote controller 312 can individually control all of the drone 32, the pan-and-tilt 33 and the camera 34. This improves the versatility of the master remote controller and the slave remote controller in the aerial shooting system using a drone, being convenient and practical, and also improving the user experience.

According to some implementations, each of the master remote controller 311 and the slave remote controller 312 is provided with a wireless transceiver module, such as Bluetooth, Wi-Fi transponder. In the single control mode, the master remote controller 311 or the slave remote controller 312 can effectively control the drone 32, the pan-and-tilt 33 and the camera 34 via the wireless transceiver module. This further improves the versatility of the remote controllers in the aerial shooting system using a drone.

Therefore, the aerial shooting system using a drone of the present disclosure can improve the flexibility of control mode, and can switch among various control modes of single and multiple remote controllers. This improves the versatility of the remote controllers in the aerial shooting system using a drone, and thus the user experience can be improved.

According to some implementations, the display device 211 of the ground station can be implemented as a display screen. According to some other implementations, the display device 211 can be disposed on the slave remote controller 312. Since, under the dual control mode, the master remote controller 311 is adapted to control the drone 32 while the salve remote controller 312 is adapted to control the pan-and-tilt 33 and the camera 34, it is helpful to look over the real-time images captured by the camera by disposing the display device on the slave remote controller 312, which can further improve control experience.

While the specific implementations of the present disclosure have been described above, it will be understood by those skilled in the art that these are illustrative only and that the protective scope of the present disclosure is defined by the appended claims. It will be apparent to those skilled in the art that various changes and modifications can be made to the described implementations without departing from the principles and spirit of the present disclosure, and such changes and modifications shall be regarded as falling within the scope of the present disclosure.

What is claimed is:

1. An aerial shooting system using a drone, comprising a ground station, a drone and a control device disposed on the drone, and the system further comprises a pan-and-tilt disposed on the drone and a camera disposed on the pan-and-tilt, wherein,
    the ground station is adapted to preset an aerial path, generate a first operation instruction based on the preset aerial path, and transmit the first operation instruction to the control device;
    the control device is adapted to control the drone to fly along the preset aerial path according to the first operation instruction;
    the ground station is adapted to mark a plurality of waypoints during the flight of the drone along the preset aerial path, and transmit the plurality of waypoints to the control device;
    the control device is adapted to plan a flight path based on the plurality of waypoints, generate a flight instruction based on the flight path, and transmit the flight instruction to the drone;
    the drone is adapted to automatically fly along the flight path according to the flight instruction; and
    the control device is adapted to control the pan-and-tilt and the camera to shoot during the automatic flight of the drone,
    wherein the ground station comprises a master remote controller and a slave remote controller, and remote control mode of the master remote controller and the slave remote controller comprises a dual control mode and a single control mode, wherein in the single control mode, either one of the master remote controller and the slave remote controller is in communication connection with the drone, the pan-and-tilt and the camera, and in the dual control mode, the master remote controller is in communication connection with the drone, while the slave remote controller is in communication connection with the pan-and-tilt and the camera, and
    the ground station further comprises a switch, and in the single control mode, the switch is capable of being operated to disconnect the communication connection between the master remote controller and the pan-and-tilt and the camera, and establish the communication connection between the slave remote controller and the pan-and-tilt and the camera, so as to switch the remote control mode from the single control mode to the dual control mode.

2. The aerial shooting system using a drone of claim 1, wherein the flight path planned by the control device is in a form of a curve.

3. The aerial shooting system using a drone of claim 1, wherein,
    the ground station is further adapted to receive a second operation instruction and transmit the second operation instruction to the control device during the automatic flight of the drone; and
    the control device is adapted to control a flight attitude of the drone according to the second operation instruction.

4. The aerial shooting system using a drone of claim 3, wherein the flight attitude comprises at least one of starting, stopping, backing off, going forward, acceleration and deceleration.

5. The aerial shooting system using a drone of claim 1, wherein,
    the ground station is further adapted to receive a third operation instruction and transmit the third operation instruction to the control device during the automatic flight of the drone; and
    the control device is adapted to control a shooting angle of the camera according to the third operation instruction.

6. The aerial shooting system using a drone of claim 1, wherein,
    the ground station further comprises a display device, and the control device is adapted to transmit flight parameters of the drone to the display device, which is used for displaying the flight parameters.

7. The aerial shooting system using a drone of claim 6, wherein,
    the control device is further adapted to transmit images captured by the camera to the display device, which is further used for displaying the captured images.

8. The aerial shooting system using a drone of claim 1, wherein,
    in the single control mode, the switch is further capable of being operated to disconnect the communication connection between the slave remote controller and the drone, and establish the communication connection between the master remote controller and the drone, so as to switch the remote control mode from the single control mode to the dual control mode.

9. The aerial shooting system using a drone of claim 1, wherein,
    in the dual control mode, the switch is capable of being operated to disconnect the communication connection between the slave remote controller and the pan-and-tilt and the camera, and establish the communication connection between the master remote controller and the pan-and-tilt and the camera, so as to switch the remote control mode from the dual control mode to the single control mode.

10. The aerial shooting system using a drone of claim 1, wherein,
in the dual control mode, the switch is further capable of being operated to disconnect the communication connection between the master remote controller and the drone, and establish the communication connection between the slave remote controller and the drone, so as to switch the remote control mode from the dual control mode to the single control mode.

11. The aerial shooting system using a drone of claim 1, wherein,
each of the master remote controller and the slave remote controller is provided with a wireless transceiver module.

12. The aerial shooting system using a drone of claim 1, wherein,
the slave remote controller is provided with a display device.

13. The aerial shooting system using a drone of claim 12, wherein,
the display device is adapted to display images captured by the camera.

14. An aerial shooting method using a drone, comprising steps of:
S1, presetting an aerial path by use of a ground station, which generates a first operation instruction based on the preset aerial path and transmits the first operation instruction to a control device;
S2, the control device controls the drone to fly along the preset aerial path according to the first operation instruction;
S3, marking a plurality of waypoints during the flight of the drone along the preset aerial path by use of the ground station, and the ground station transmits the plurality of waypoints to the control device;
S4, the control device plans a flight path based on the plurality of waypoints, generates a flight instruction based on the flight path, and transmits the flight instruction to the drone;
S5, the drone automatically flies along the flight path according to the flight instruction; and
S6, controlling the drone to shoot during the automatic flight of the drone by use of the control device,
wherein the method further comprises the following steps:
connecting in communication either one of a master remote controller and a slave remote controller of the ground station with the drone, a pan-and-tilt provided on the drone and a camera provided on the pan-and-tilt in a single control mode, and connecting in communication the master remote controller with the drone and connecting in communication the slave remote controller with the pan-and-tilt and the camera in a dual control mode, and
in the single control mode, operating a switch to disconnect the communication connection between the master remote controller and the pan-and-tilt and the camera, and establish the communication connection between the slave remote controller and the pan-and-tilt and the camera so as to switch from the single control mode to the dual control mode.

15. The aerial shooting method using a drone of claim 14, wherein the flight path planned in the step of S4 is in a form of a curve.

16. The aerial shooting method using a drone of claim 14, wherein in the step of S6, the ground station receives a second operation instruction and transmits the second operation instruction to the control device during the automatic flight of the drone; and
the control device controls a flight attitude of the drone according to the second operation instruction.

17. The aerial shooting method using a drone of claim 16, wherein the flight attitude comprises at least one of starting, stopping, backing off, going forward, acceleration and deceleration.

18. The aerial shooting method using a drone of claim 14, wherein in the step of S6, the ground station receives a third operation instruction and transmits the third operation instruction to the control device during the automatic flight of the drone; and
the control device controls a shooting angle of a camera of the drone according to the third operation instruction.

* * * * *